United States Patent
Byun et al.

(10) Patent No.: US 10,341,971 B2
(45) Date of Patent: Jul. 2, 2019

(54) METHOD AND APPARATUS FOR RADIO INTERFACE-BASED INTER-CELL SYNCHRONIZATION IN WIRELESS COMMUNICATION SYSTEM

(71) Applicant: LG ELECTRONICS INC., Seoul (KR)

(72) Inventors: Daewook Byun, Seoul (KR); Yunjung Yi, Seoul (KR); Jian Xu, Seoul (KR); Kyungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 15/306,788

(22) PCT Filed: May 8, 2015

(86) PCT No.: PCT/KR2015/004582
§ 371 (c)(1),
(2) Date: Oct. 26, 2016

(87) PCT Pub. No.: WO2015/170901
PCT Pub. Date: Nov. 12, 2015

(65) Prior Publication Data
US 2017/0055237 A1 Feb. 23, 2017

Related U.S. Application Data

(60) Provisional application No. 61/990,711, filed on May 9, 2014.

(51) Int. Cl.
*H04W 56/00* (2009.01)
*H04W 84/04* (2009.01)

(52) U.S. Cl.
CPC ...... *H04W 56/0015* (2013.01); *H04W 56/001* (2013.01); *H04W 84/045* (2013.01)

(58) Field of Classification Search
CPC ........... H04W 56/0015; H04W 56/001; H04W 84/045; H04J 3/0641; H04B 17/336
See application file for complete search history.

(56) References Cited

U.S. PATENT DOCUMENTS

| | | | |
|---|---|---|---|
| 2013/0155945 A1 | 6/2013 | Chen | |
| 2017/0078985 A1* | 3/2017 | Zheng | H04J 3/0641 |

FOREIGN PATENT DOCUMENTS

| | | |
|---|---|---|
| WO | 2014021563 | 2/2014 |
| WO | 2014069788 | 5/2014 |

OTHER PUBLICATIONS

"3GPP; TSGRAN; Small cell enhancements for E-UTRA and E-UTRAN-Physical layer aspects (Release 12)," 3GPP TR 36.872 V12.1.0, Dec. 20, 2013, see pp. 63, 70, 99.

(Continued)

Primary Examiner — Vinncelas Louis
(74) Attorney, Agent, or Firm — Dentons US LLP

(57) ABSTRACT

Provided are a method and an apparatus for transmitting a maximum stratum level in a wireless communication system. An evolved NodeB (eNB) or a home eNB (HeNB) having a global positioning system (GPS) constitutes a maximum stratum level indicating a maximum value of a hop capable of supporting radio interface based synchronization (RIBS) and transmits the constituted maximum stratum level to a small cell. Meanwhile, the small cell determines whether a stratum level is greater than the maximum stratum level, and transmits the maximum stratum level to the eNB or the HeNB having the GPS when the stratum level is greater than the maximum stratum level.

9 Claims, 21 Drawing Sheets

(56) References Cited

OTHER PUBLICATIONS

"3GPP; TSGRAN; TDD Home eNode B (NeNB) Radio Frequency (RF) requirements analysis (Release 11)," 3GPP TR 36.922 V11.0.0, Sep. 24, 2012, see pp. 44, 45.

* cited by examiner

METHOD AND APPARATUS FOR RADIO INTERFACE-BASED INTER-CELL SYNCHRONIZATION IN WIRELESS COMMUNICATION SYSTEM

CROSS-REFERENCE TO RELATED APPLICATIONS

This application is the National Stage filing under 35 U.S.C. 371 of International Application No. PCT/KR2015/004582, filed on May 8, 2015, which claims the benefit of U.S. Provisional Application No. 61/990,711 filed on May 9, 2014, the contents of which are all hereby incorporated by reference herein in their entirety.

BACKGROUND OF THE INVENTION

Field of the Invention

The present invention relates to wireless communication, and more particularly to a method and apparatus for radio interface-based inter-cell synchronization in a wireless communication system.

Related Art

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion in 3GPP LTE rel-12, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

Various aspects may be considered in order to enhance small cells. In particular, in an aspect of a physical layer, a synchronization method using radio interface between the eNB and a home eNB (HeNB) for efficient synchronization of an inter-cell, that is, a synchronization method based on a network listening scheme has been discussed. There may be a need for an efficient inter-cell synchronization method of a small cell based on network listening.

SUMMARY OF THE INVENTION

The present invention provides a method and apparatus for radio interface-based inter-cell synchronization. The present invention provides a method for defining a maximum stratum level for inter-cell synchronization of small cells to transmit the defined maximum stratum level to another cell.

In an aspect, a method for transmitting a maximum stratum level by an evolved NodeB (eNB) in a wireless communication system is provided. The method includes configuring the maximum stratum level indicating a maximum value of a hop capable of supporting radio interface based synchronization (RIBS), and transmitting the configured maximum stratum level to a small cell.

In another aspect, a method for transmitting a maximum stratum level by a small cell in a wireless communication system is provided. The method includes determining whether a stratum level of the small cell is greater than the maximum stratum level, transmitting the maximum stratum level to an evolved NodeB (eNB) or a home eNB (HeNB) having a global positioning system (GPS) when the stratum level of the small cell is greater than the maximum stratum level.

The small cell can be efficiently synchronized to a macro cell.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
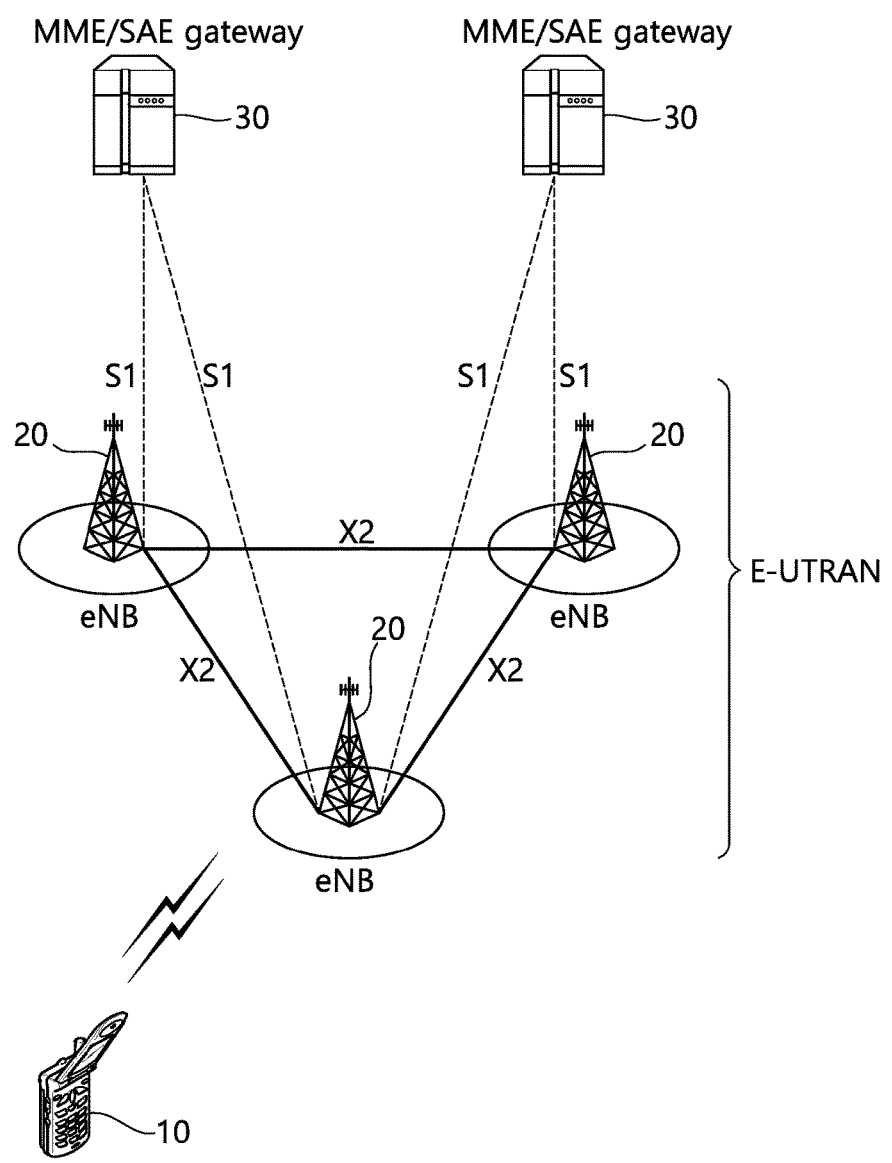
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
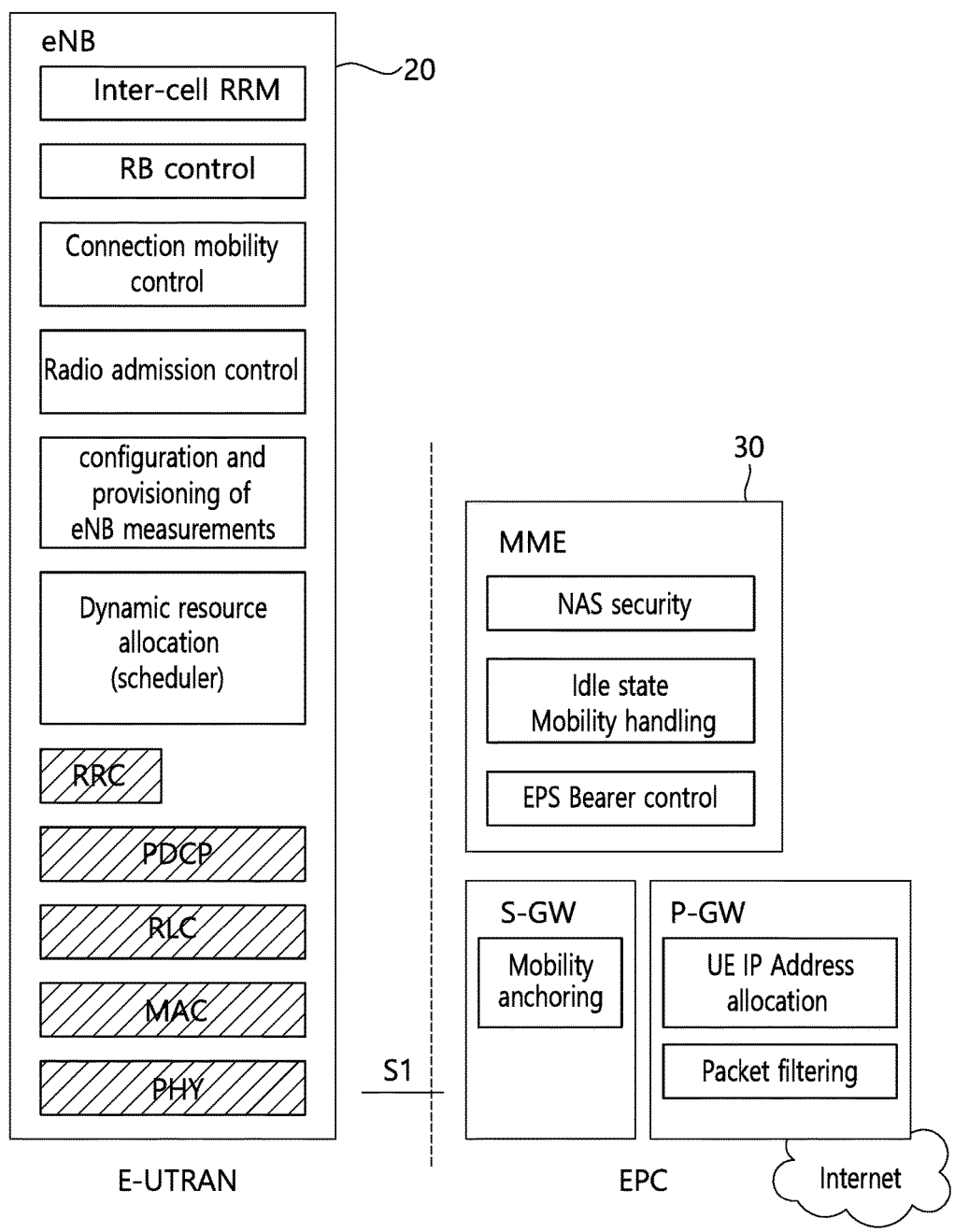
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
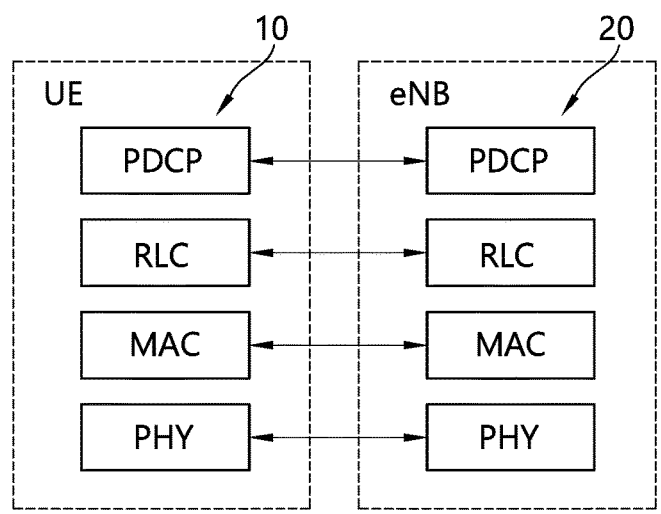
FIG. 3 shows a block diagram of a user plane protocol stack of an LTE system.
Figure 4:
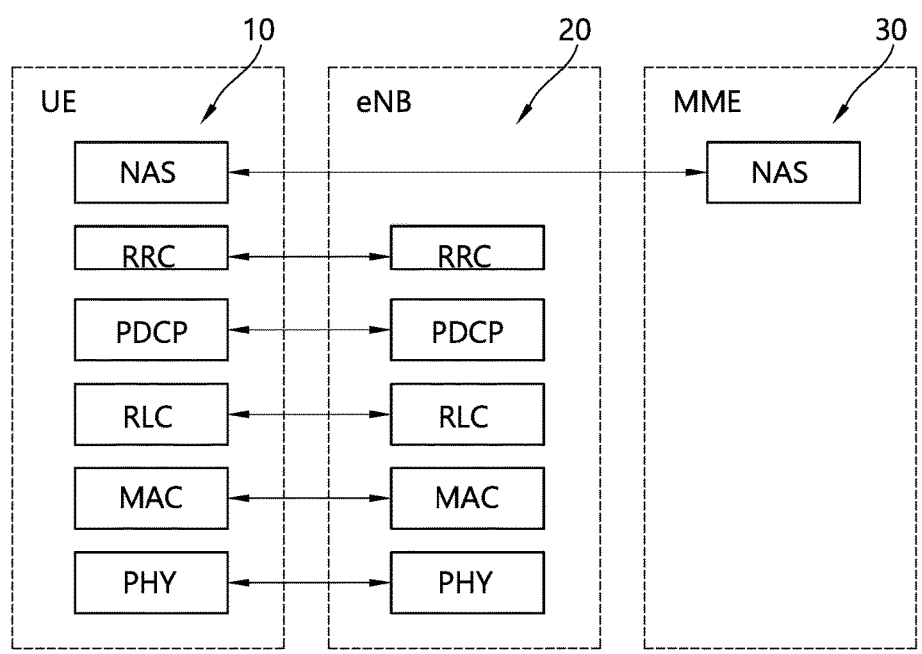
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
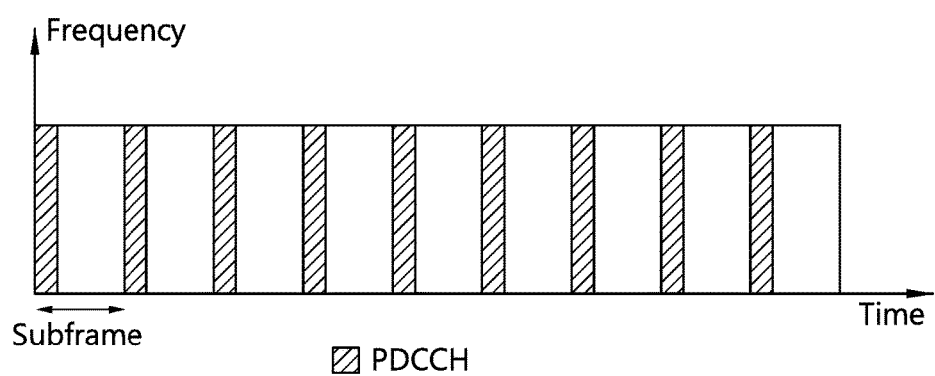
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle.

The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Radio-interface based synchronization (RIBS) is described. The RIBS allows an eNB to monitor a reference signal (RS) of another eNB by network listening. The above requires operations, administration and maintenance (OAM) to configure RS information, that is, information such as a pattern, a period, and offset to the eNB. For example, the OAM may configure the RS information through one-to-one mapping of a stratum level and the RS. In order to easily listen the RS of another eNB, a listening eNB may request an interfering eNB to mute a subframe by network signaling.

Figure 6:
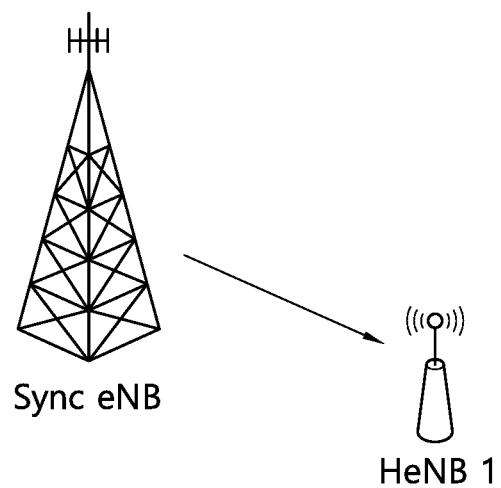
FIG. 6 and FIG. 7 shows example of synchronization using network listening.
Figure 7:
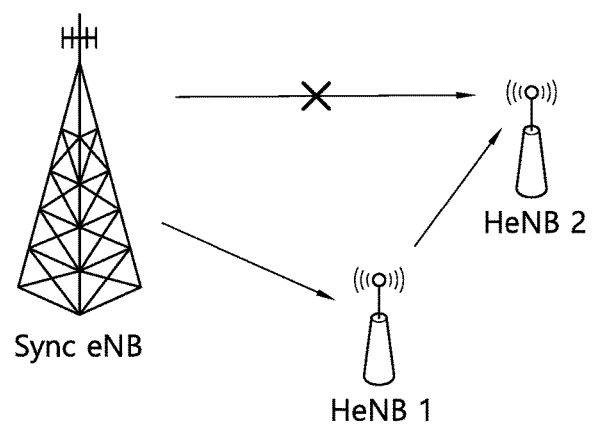

FIG. 6 and FIG. 7 shows example of synchronization using network listening. The synchronization using network listening means a technology of obtaining timing of a HeNB from an eNB or a HeNB synchronized to each other (by a global navigation satellite system (GNSS)). In FIG. 6, a HeNB1 receives a primary synchronization signal (PSS) or a secondary synchronization signal (SSS) of an eNB (sync eNB) having a global positioning system (GPS) to be synchronized to the sync eNB. Single-hop synchronization shown in FIG. 6 is generally performed when coverage of a macro cell is excellent. Meanwhile, in FIG. 7, since strength of PSS/SSS transmitted from the sync eNB is low, the HeNB2 may not receive the PSS/SSS of the sync eNB. Instead, a HeNB2 may receive PSS/SSS of the HeNB1 synchronized to the sync eNB. Accordingly, the HeNB2 is synchronized to the HeNB1. As shown in FIG. 7, in order to perform multi-hop synchronization, a synchronization stratum may be defined. The synchronization stratum may be defined as the smallest number of hops between an eNB or HeNB having the GPS and a HeNB to be synchronized thereto. The number of the synchronization stratum of a specific HeNB is more than that number of synchronization stratum of a donor (H)eNB, i.e. a HeNB tracked from a specific (H)eNB, by one. FIG. 7, the sync eNB includes a synchronization stratum of 0, a HeNB1 of 1, and a HeNB2 of 2. Hereinafter, the synchronization stratum may be compatibly used with a stratum level.

The HeNB needs to periodically track a signal of an eNB and a HeNB being a synchronization source thereof in order to maintain synchronization after the synchronization. To this end, the HeNB may track a cell-specific RS (CRS) transmitted from the eNB or the HeNB being a synchronization source. The above may be implemented by following two schemes.

(1) Multicast broadcast single frequency network (MB-SFN) subframe-based network listening: is a scheme using a MBSFN subframe for track synchronization. In order to reduce impact in UE and to stop transmission of a specific subframe for track synchronization, the HeNB may declare a corresponding subframe as a MBSFN subframe. Accordingly, the HeNB may track a CRS transmitted from a synchronization source thereof in the MBSFN subframe.

(2) Time division duplex (TDD) special subframe based network listening: is a scheme for tracking a CRS of a synchronization source by allocating different configurations defined with respect to a specific subframe in a TDD frame with respect to the HeNB and a synchronization source thereof. In more detail, the HeNB and the synchronization source use different special subframe configurations. In this case, the synchronization source uses a special subframe configuration so that relatively more OFDM symbols are allocated to a downlink pilot time slot (DwPTS), while the HeNB uses a special subframe configuration so that relatively less OFDM symbols are allocated to the DwPTS. Accordingly, the HeNB may use a guard period (GP) in order to track a CRS of a synchronization source transmitted from a DwPTS without great impact in general transmission thereof.

Meanwhile, the HeNB needs to know stratum level information of a node close to the HeNB to determine a stratum level thereof using the stratum level information. Further, the HeNB needs to report the determined stratum level thereof and a current synchronization status to a neighboring node. To this end, backhaul signaling may be used.

Figure 8:
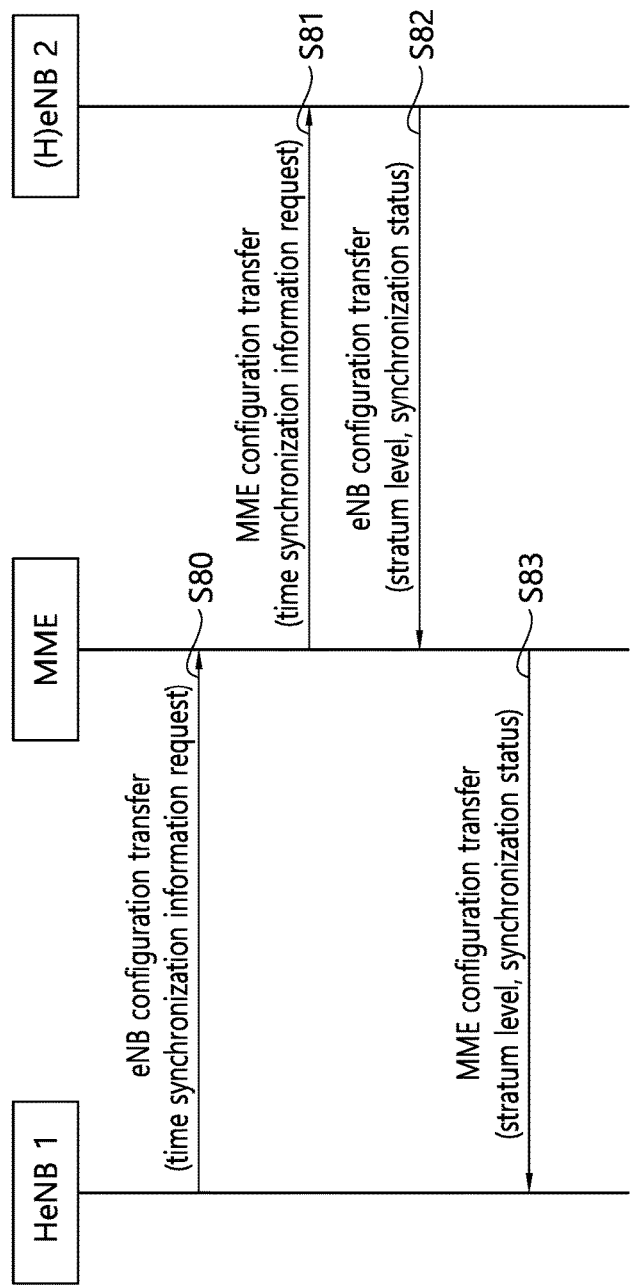
FIG. 8 shows an example of a method for transmitting a stratum level and a synchronization status using backhaul signaling.

FIG. 8 shows an example of a method for transmitting a stratum level and a synchronization status using backhaul signaling. In step S80, a HeNB1 transmits an eNB configuration transfer message including a time synchronization information request to an MME. In step S81, the MME transmits an MME configuration transfer message including the time synchronization information request to a HeNB2. In step S82, the HeNB2 transmits an eNB configuration transfer message including a stratum level and a synchronization status to the MME. In step S83, the MME transmits an MME configuration transfer message including the stratum level and the synchronization status to the HeNB1.

The stratum level and the synchronization status may be transmitted through a Time Synchronization Info information element (IE). The Time Synchronization Info IE is used to signal the stratum level and the synchronization status for synchronization using network listening. The time synchronization information may be included in a self-organizing network (SON) IE to be included in an eNB configuration transfer message or an MME configuration transfer message. Table 1 represents an example of time synchronization information IE.

TABLE 1

| IE/Group Name | Presence | Range | IE type and reference | Semantics description |
|---|---|---|---|---|
| Synchronization Info | | | | |
| >Stratum Level | M | | INTEGER (0 . . . 3, . . .) | |
| >Synchronization status | M | | ENUMERATED (Synchronous, Asynchronous, . . .) | |

Referring to the table 1, the Time Synchronization Info IE includes the stratum level field and the synchronizations status field.

Figure 9:
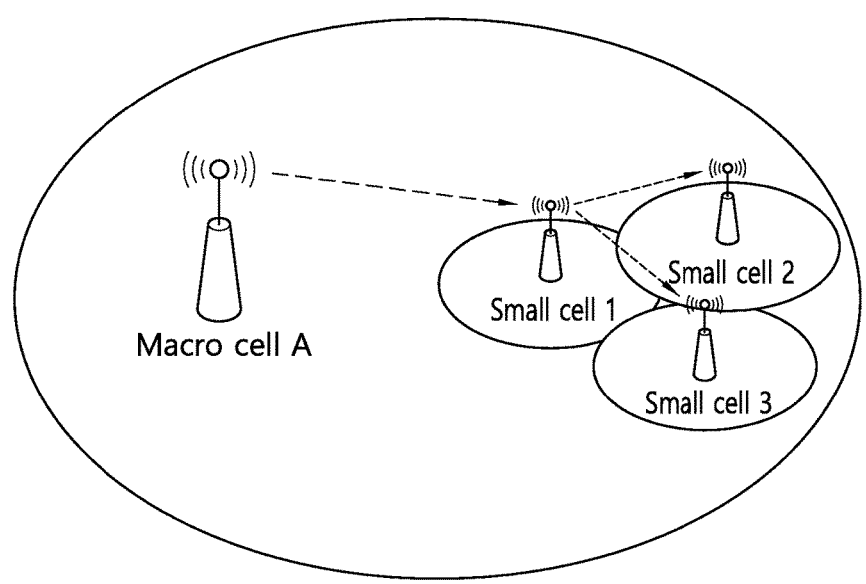
FIG. 9 shows an example of synchronization using wireless interface between a macro cell and a small cell.

FIG. 9 shows an example of synchronization using wireless interface between a macro cell and a small cell. Referring to FIG. 9, a plurality of small cells (a small cell 1, a small cell 2, and a small cell 3) is deployed in coverage of a macro cell A. As described above, when the small cell is deployed, if synchronization using existing network listening is performed, following problems may occur. For example, it is assumed in FIG. 9 that the small cell 1 is synchronized to the macro cell A, and the small cells 2 and 3 are synchronized to the small cell 1. Using backhaul signal illustrated in FIG. 8, the small cell 1 may know a stratum level and a synchronization status of the macro cell A, and the small cells 2 and 3 may know a stratum level and a synchronization status of the small cell 1. Each small cell may determine a stratum level and a synchronization status thereof using the above information.

When the small cells 2 and 3 synchronized to the small cell 1 determine a stratum level and a synchronization status thereof, problems may occur. A synchronization accuracy requirement is synchronization accuracy required between two nodes to be synchronized to each other. However, if the number of hops is increased in multi-hop synchronization, a per synchronization accuracy requirement gradually becomes tight. That is why synchronization is indirectly achieved through an eNB or a HeNB other than the sync eNB. Accordingly, in order to satisfy the synchronization accuracy in the multi-hop synchronization, a reception interference plus noise ratio (SINR) threshold of a RIBS-RS transmitted from a node of a previous hop should be higher than that of single-hop synchronization. A HeNB performing the multi-hop synchronization may be synchronized by obtaining a reception RIBS-RS SINR greater than a SINR threshold. However, since the small cell 1 does not know whether the small cell 1 is used as a hop for multi-hop synchronization of different small cells, that is, the small cells 2 and 3 after being synchronized to the macro cell A, the small cell 1 may not change a SINR threshold thereof. Accordingly, if the small cell 1 is synchronized to the macro cell A with a low RIBS-RS SINR, although the small cells 2 and 3 are synchronized to the small cell 1, the synchronization accuracy requirement may not be satisfied. As a result, the small cells 2 and 3 may not be synchronized to the macro cell A.

As described above, in order to solve the problem in that a small cell cannot be synchronized to a macro cell, according to an embodiment of the present invention, a maximum stratum level may be defined. The maximum stratum level means a maximum value of a hop where an eNB or a HeNB having a GPS may support radio interface-based synchronization to another small cell. The maximum stratum level may be determined by the eNB or the HeNB having a GPS. The small cell receiving the maximum stratum level may estimate how extent is a threshold of RIBS-RS SINR to be received from an eNB or a small cell of a previous hop, in order to satisfy synchronization accuracy requirement per hop. Accordingly, the small cell may be efficiently synchronized to the macro cell.

Figure 10:
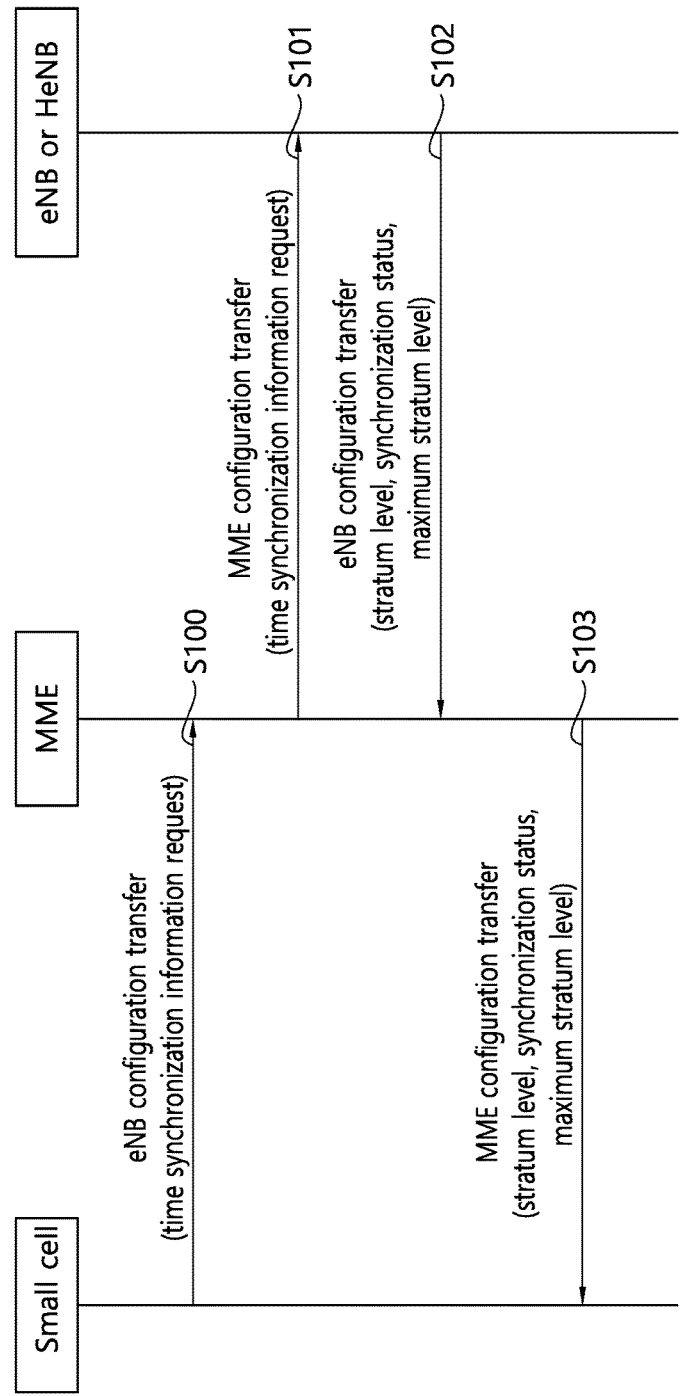
FIG. 10 shows an example of a method for transmitting a maximum stratum level according to an embodiment of the present invention.

FIG. 10 shows an example of a method for transmitting a maximum stratum level according to an embodiment of the present invention. In step S100, a small cell transmits an eNB configuration transfer message including a time synchronization information request to an MME. In step S101, the MME transmits an MME configuration transfer message including the time synchronization information request to an eNB and a HeNB having a GPS. In step S102, the eNB and the HeNB having a GPS transmits an eNB configuration transfer message including a stratum level, a synchronization status, and a maximum stratum level to the MME. In step S103, the MME transmits an MME configuration transfer message including the stratum level, the synchronization status, and the maximum stratum level to the small cell.

According to an embodiment of the present invention, the Time Synchronization Info IE illustrated in the table 1 may be modified as illustrated in table 2.

TABLE 2

| IE/Group Name | Presence Range | IE type and reference | Semantics description |
|---|---|---|---|
| Synchronization Info | | | |
| >Stratum Level | M | INTEGER (0 . . . 3, . . .) | |

TABLE 2-continued

| IE/Group Name | Presence Range | IE type and reference | Semantics description |
|---|---|---|---|
| >Synchronization status | M | ENUMERATED (Synchronous, Asynchronous, . . .) | |
| >Maximum Stratum Level | M | INTEGER (0 . . . 6, . . .) | |

Referring to the table 2, the Time Synchronization Info IE includes an additional maximum stratum level field.

Meanwhile, there may be a small cell having a stratum level greater than the maximum stratum level. If the small cell reports the maximum stratum level or a cause to the eNB or the HeNB having the GPS through S1/X2 interface, the eNB or the HeNB having the GPS may update the maximum stratum level according to a ratio of small cells having a stratum level greater than the maximum stratum level.

Hereinafter, according to various embodiments, a method for transmitting the maximum stratum level or the cause by a small cell having a stratum level greater than the maximum stratum level is described. First, a method for transmitting the maximum stratum level or the cause through S1 interface is described.

Figure 11:
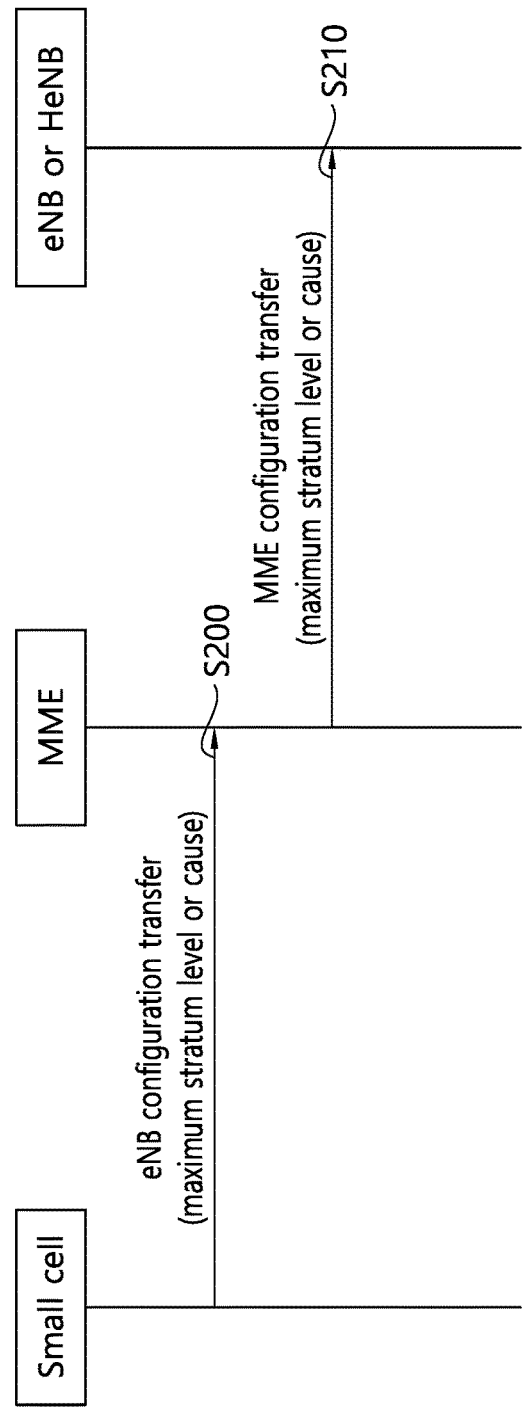
FIG. 11 shows another example of a method for transmitting a maximum stratum level according to an embodiment of the present invention.

FIG. 11 shows another example of a method for transmitting a maximum stratum level according to an embodiment of the present invention. In step S200, a small cell having a stratum level greater than a maximum stratum level transmits an eNB configuration transfer message including the maximum stratum level and/or a cause to an MME. In step S210, the MME transmits an MME configuration transfer message including the maximum stratum level and/or the cause to an eNB or another HeNB having a GPS. Accordingly, the eNB or another HeNB having a GPS may update the maximum stratum level.

Hereinafter, a method for transmitting the maximum stratum level and/or the cause through X2 interface is described. If there is the X2 interface between a small cell and the eNB or the HeNB having the GPS, the maximum stratum level and/or the cause may be transmitted through X2 interface. First, the eNB or the HeNB having a GPS may report through an indicator during an X2 setup procedure so that the small cell transmits the maximum stratum level and/or the cause to the eNB or the HeNB having a GPS. When the stratum level of the small cell is greater than the maximum stratum level, the small cell may transmit the maximum stratum level and/or the cause to the eNB or the HeNB having the GPS indicated by the received indicator.

Figure 12:
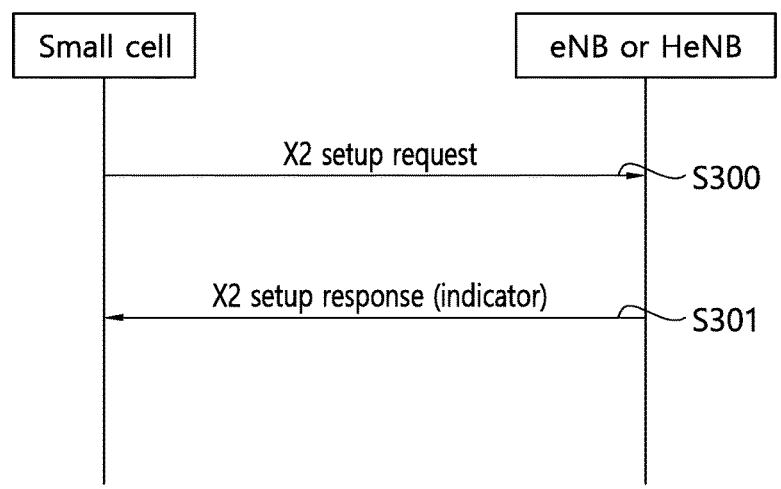
FIG. 12 shows another example of a method for transmitting a maximum stratum level according to an embodiment of the present invention.

FIG. 12 shows another example of a method for transmitting a maximum stratum level according to an embodiment of the present invention. In step S300, a small cell transmits an X2 setup request message to an eNB or a HeNB having a GPS. In step S301, the eNB or the HeNB having the GPS transmits an X2 setup response message including an indicator to the small cell. The indicator indicates that the small cell transmits a maximum stratum level and/or a cause to the eNB or the HeNB having a GPS. Accordingly, when the stratum level of the small cell is greater than the maximum stratum level, the small cell may transmit the maximum stratum level and/or the cause to the eNB or the HeNB having the GPS indicated by the indicator.

Figure 13:
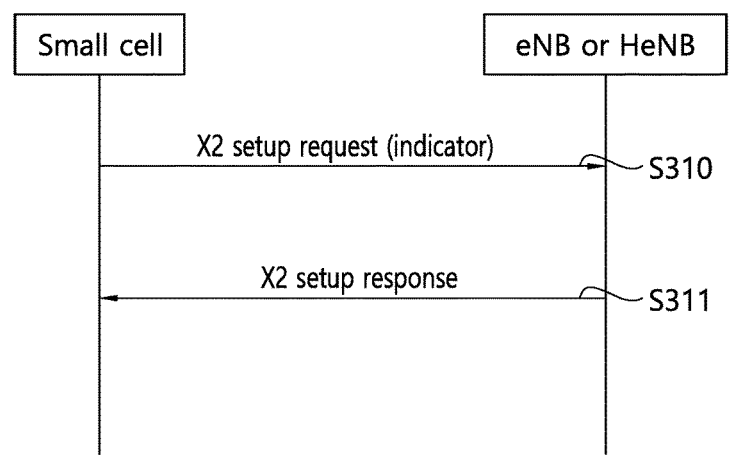
FIG. 13 shows another example of a method for transmitting a maximum stratum level according to an embodiment of the present invention.

FIG. 13 shows another example of a method for transmitting a maximum stratum level according to an embodiment of the present invention. In step S310, an eNB or a HeNB having a GPS transmits an X2 setup request message including an indicator to a small cell. The indicator indicates that the small cell transmits a maximum stratum level and/or a cause to the eNB or the HeNB having a GPS. Accordingly, when the stratum level of the small cell is greater than the maximum stratum level, the small cell may transmit the maximum stratum level and/or the cause to the eNB or the HeNB having the GPS indicated by the indicator. In step S311, the small cell transmits an X2 setup response message to the eNB or the HeNB having the GPS.

Alternatively, the eNB having a GPS and the HeNB having a GPS may transmit one of a load information message or a resource status request message to all small cells in coverage of the eNB or all small cell in a cluster in which the HeNB having the GPS is included. The load information message or the resource status request message may include the above indicator. When the stratum level of the small cell is greater than the maximum stratum level, the small cell may transmit a load information message or a resource status update message including the maximum stratum level and/or the cause to the eNB or the HeNB having the GPS based on the received load information message or the resource status request message.

Figure 14:
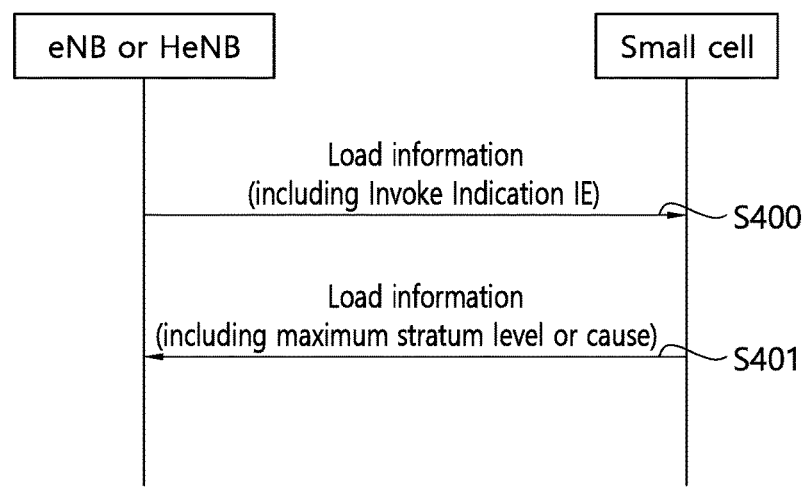
FIG. 14 shows another example of a method for transmitting a maximum stratum level according to an embodiment of the present invention.

FIG. 14 shows another example of a method for transmitting a maximum stratum level according to an embodiment of the present invention. In step S400, an eNB or a HeNB having a GPS transmits a load information message including an Invoke Indication IE to a small cell. The Invoke Indication IE may indicate that the small cell should transmit the maximum stratum level and/or the cause to the eNB or the HeNB having a GPS. In step S401, the small cell transmits a load information message including the maximum stratum level and/or the cause to the eNB or the HeNB having the GPS.

Figure 15:
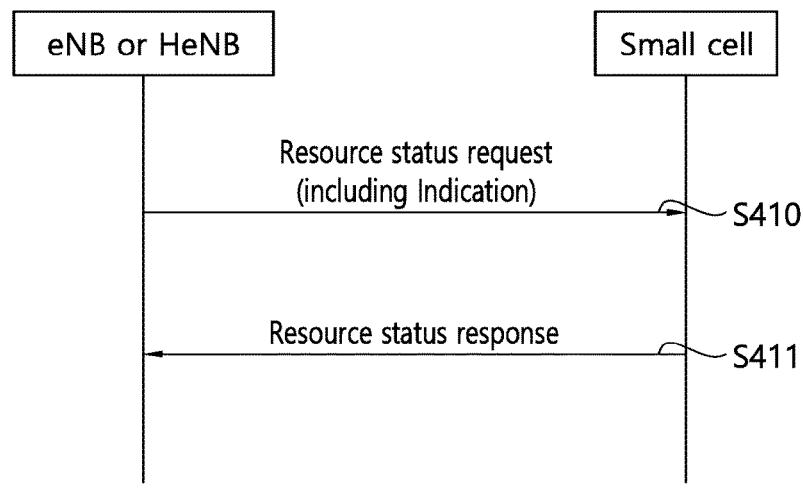
FIG. 15 and FIG. 16 show other examples of a method for transmitting a maximum stratum level according to an embodiment of the present invention.
Figure 16:
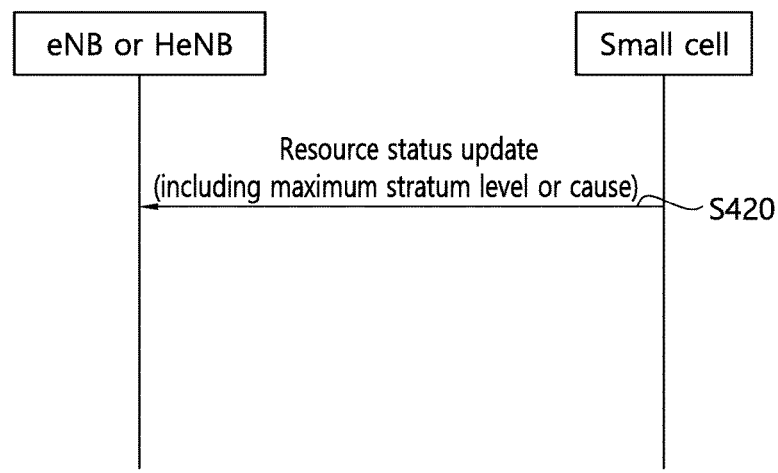

FIG. 15 and FIG. 16 show other examples of a method for transmitting a maximum stratum level according to an embodiment of the present invention. In step S410 of FIG. 15, the eNB or the HeNB having a GPS transmits a resource status request message including an indicator to a small cell. The indicator may indicate that the small cell transmits a maximum stratum level and/or a cause to the eNB or the HeNB having a GPS. In step S411, the small cell transmits a resource status response message to the eNB or the HeNB having a GPS. In step S420 of FIG. 16, the small cell transmits a resource status update message including the maximum stratum level and/or the cause to the eNB or the HeNB having the GPS.

Figure 17:
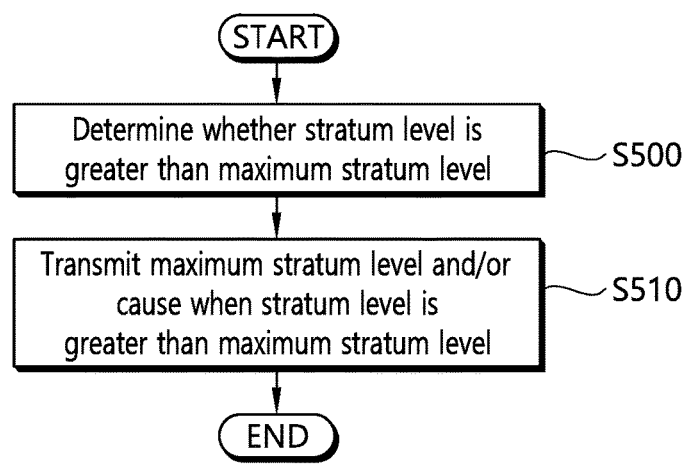
FIG. 17 shows another example of a method for transmitting a maximum stratum level according to an embodiment of the present invention.

FIG. 17 shows another example of a method for transmitting a maximum stratum level according to an embodiment of the present invention. In step S500, the small cell determines whether a stratum level of the small cell is greater than the maximum stratum level. When the stratum level of the small cell is greater than the maximum stratum level, the small cell transmits the maximum stratum level and/or the cause to the eNB or the HeNB having the GPS in step S510. The maximum stratum level and/or the cause may be transmitted through an eNB configuration transfer message using S1 interface or through a load information message or a resource status update message using X2 interface. Further, the small cell may receive an indicator indicating that the maximum stratum level and/or the cause is to be transmitted to the eNB or the HeNB having the GPS from the eNB or the HeNB having the GPS. The indicator may be received through an X2 request message or an X2 response message.

Meanwhile, when there is X2 interface between the eNB or the HeNB having a GPS and the eNB or the HeNB having the GPS may support a plurality of frequencies, the small cell needs to know what is a frequency supporting a RIBS-RS for synchronization. In this case, the frequency supporting a RIBS-RS may be indicated by an indicator in an X2 setup request/response message or an eNB configuration update message. Table 3 illustrates an example of a Served Cell Information IE including the indicator. The Served Cell Information IE may be included in X2 setup request/response message or an eNB configuration update message.

TABLE 3

| IE/Group Name | Presence | Range | IE type and reference | Semantics description | Criticality | Assigned Criticality |
|---|---|---|---|---|---|---|
| PCI | M | | INTEGER (0 ... 503, ...) | Physical Cell ID | — | — |
| Cell ID | M | | ECGI 9.2.14 | | — | — |
| TAC | M | | OCTET STRING(2) | Tracking Area Code | — | — |
| Broadcast PLMNs | | 1 ... <maxnoofBPLMNs> | | Broadcast PLMNs | — | — |
| >PLMN identity | M | | 9.2.4 | | — | — |
| CHOICE EUTRA-Mode-Info | M | | | | — | — |
| >FDD | | | | | | |
| >>FDD Info | | 1 | | | — | — |
| >UL EARFCN | M | | EARFCN 9.2.26 | Corresponds to $N_{UL}$ in TS 36.104 [16] for E-UTRA operating bands for which it is defined; ignored for E-UTRA operating bands for which $N_{UL}$ is not defined | — | — |
| >DL EARFCN | M | | EARFCN 9.2.26 | Corresponds to $N_{DL}$ in TS 36.104 [16] | — | — |

TABLE 3-continued

| IE/Group Name | Presence | Range | IE type and reference | Semantics description | Criticality | Assigned Criticality |
|---|---|---|---|---|---|---|
| >>>>Indication | O | | | | — | — |
| >>>UL Transmission Bandwidth | M | | Transmission Bandwidth 9.2.27 | Same as DL Transmission Bandwidth in this release; ignored in case UL EARFCN value is ignored | — | — |
| >>>DL Transmission Bandwidth | M | | Transmission Bandwidth 9.2.27 | | — | — |
| >>>UL EARFCN Extension | O | | EARFCN Extension 9.2.65 | If this IE is present, the value signaled in the UL EARFCN IE is ignored. | YES | reject |
| >>>DL EARFCN Extension | O | | EARFCN Extension 9.2.65 | If this IE is present, the value signaled in the DL EARFCN IE is ignored. | YES | reject |
| >TDD | | | | | — | — |
| >>TDD Info | | 1 | | | — | — |
| >>>EARFCN | M | | 9.2.26 | Corresponds to $N_{DL}/N_{UL}$ in TS 36.104 [16] | — | — |
| >>>Transmission Bandwidth | M | | Transmission Bandwidth 9.2.27 | | — | — |
| >>>Subframe Assignment | M | | ENUMERATED (sa0, sa1, sa2, sa3, sa4, sa5, sa6, . . . ) | Uplink-downlink subframe configuration information defined in TS 36.211 [10] | — | — |
| >>>Special Subframe Info | | 1 | | Special subframe configuration information defined in TS 36.211 [10] | — | — |
| >>>>Special Subframe Patterns | M | | ENUMERATED (ssp0, ssp1, ssp2, ssp3, ssp4, ssp5, ssp6, ssp7, ssp8, . . . ) | | — | — |
| >>EARFCN Extension | O | | 9.2.65 | If this IE is present, the value signaled in the EARFCN IE is ignored. | YES | reject |
| >>>>Cyclic Prefix DL | M | | ENUMERATED (Normal, Extended, . . . ) | | — | — |
| >>>>Cyclic Prefix UL | M | | ENUMERATED (Normal, Extended, . . . ) | | — | — |
| >>>Additional Special Subframe Info | O | | | Special subframe configuration information defined in TS 36.211 [10]. Only for newly defined configuration of special subframe from Release 11. | GLOBAL | ignore |
| >>Additional Special Subframe Patterns | M | | ENUMERATED (ssp0, ssp1, ssp2, ssp3, ssp4, ssp5, ssp6, ssp7, ssp8, ssp9, . . . ) | | — | — |

TABLE 3-continued

| IE/Group Name | Presence | Range | IE type and reference | Semantics description | Criticality | Assigned Criticality |
|---|---|---|---|---|---|---|
| >>>>Cyclic Prefix DL | M | | ENUMERATED (Normal, Extended, . . . ) | | — | — |
| >>>>Cyclic Prefix UL | M | | ENUMERATED (Normal, Extended, . . . ) | | — | — |
| Number of Antenna Ports | O | | 9.2.43 | | YES | ignore |
| PRACH Configuration | O | | PRACH Configuration 9.2.50 | | YES | ignore |
| MBSFN SubframeInfo | | 0 . . . <maxnoof MBSFN> | | MBSFN subframe defined in TS 36.331 [9] | GLOBAL | ignore |
| >Radioframe Allocation Period | M | | ENUMERATED (n1, n2, n4, n8, n16, n32, . . . ) | | — | — |
| >Radioframe Allocation Offset | M | | INTEGER (0 . . .7, . . . ) | | — | — |
| >Subframe Allocation | M | | 9.2.51 | | — | — |
| CSG ID | O | | 9.2.53 | | YES | ignore |
| MBMS Service Area Identity List | | 0 . . . <maxnoof MBMS ServiceArea Identities> | | Supported MBMS Service Area Identities in the cell | GLOBAL | ignore |
| >MBMS Service Area Identity | | | OCTET STRING(2) | MBMS Service Area Identities as defined in TS 23.003 [29] | | |
| MultibandInfoList | O | | 9.2.60 | | YES | ignore |

Referring to the table 3, the Served Cell Information IE includes an indicator field.

Figure 18:
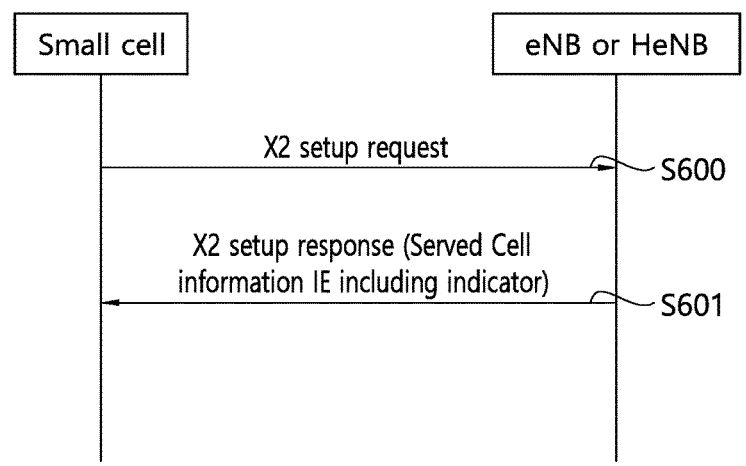
FIG. 18 shows another example of a method for transmitting a maximum stratum level according to an embodiment of the present invention.

FIG. 18 shows another example of a method for transmitting a maximum stratum level according to an embodiment of the present invention. In step S600, a small cell transmits an X2 setup request message to an eNB or a HeNB having a GPS. In step S601, the eNB or the HeNB having the GPS transmits an X2 setup response message including a Served Cell Information IE having an indicator to the small cell. The indicator indicates a frequency supporting an RIBS-RS. A Served Cell Information IE may follow the table 3.

Figure 19:
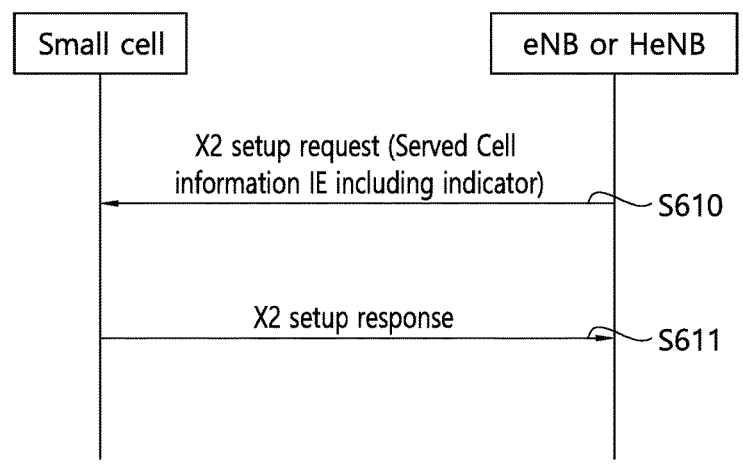
FIG. 19 shows another example of a method for transmitting a maximum stratum level according to an embodiment of the present invention.

FIG. 19 shows another example of a method for transmitting a maximum stratum level according to an embodiment of the present invention. In step S610, the eNB or the HeNB having the GPS transmits an X2 setup response message including a Served Cell Information IE having an indicator to the small cell. The indicator indicates a frequency supporting an RIBS-RS. A Served Cell Information IE may follow the table 3. In step S611, the small cell transmits the X2 setup response message to the eNB or the HeNB having the GPS.

Figure 20:
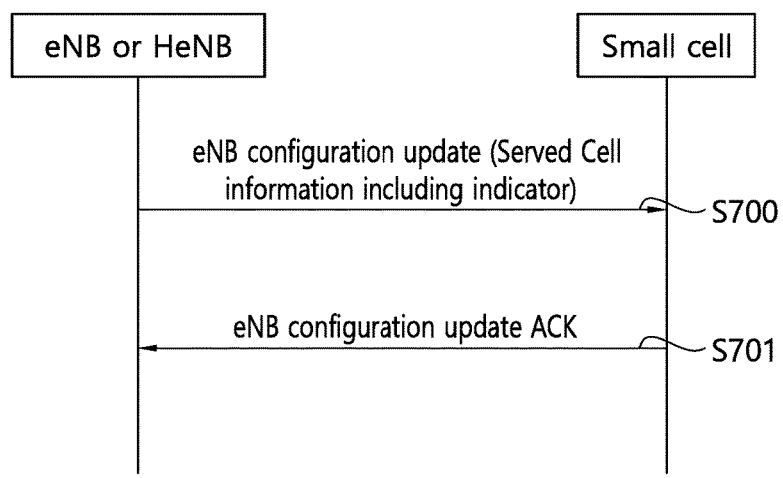
FIG. 20 shows another example of a method for transmitting a maximum stratum level according to an embodiment of the present invention.

FIG. 20 shows another example of a method for transmitting a maximum stratum level according to an embodiment of the present invention. In step S700, the eNB or the HeNB having the GPS transmits an X2 setup response message including a Served Cell Information IE having an indicator to the small cell. The indicator indicates a frequency supporting an RIBS-RS. A Served Cell Information IE may follow the table 3. In step S701, the small cell transmits an eNB configuration update acknowledge message to the eNB or the HeNB having the GPS.

Figure 21:
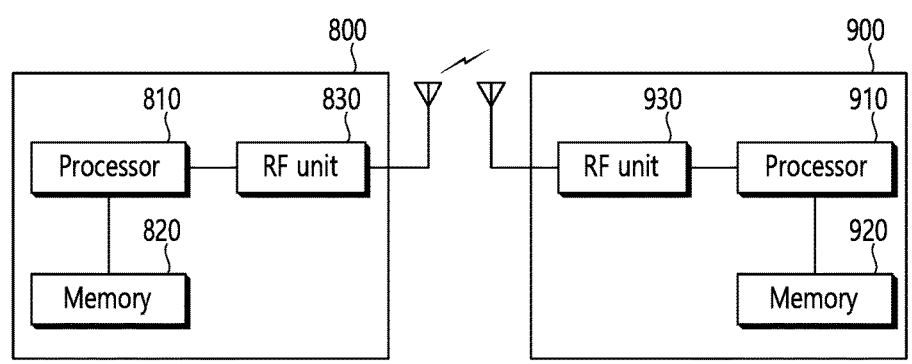
FIG. 21 shows a block diagram of a wireless communication system to implement an embodiment of the present invention.

FIG. 21 shows a block diagram of a wireless communication system to implement an embodiment of the present invention.

An eNB of a small cell 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An eNB of a macro cell or another small cell 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a small cell in a wireless communication system, the method comprising:
   receiving a first maximum stratum level, indicating a maximum value of a hop capable of supporting radio interface based synchronization (RIBS), from an evolved NodeB (eNB) having a global positioning system (GPS);
   transmitting information indicating that a stratum level of the small cell is greater than the first maximum stratum level to the eNB, when the stratum level of the small cell is greater than the first maximum stratum level; and
   receiving a second maximum stratum level from the eNB, wherein the second maximum stratum level is determined by the eNB based on a ratio of small cells having stratum level greater than the first maximum stratum level, and
   wherein the information further includes a cause for the greater small cell stratum level.

2. The method of claim 1, wherein the first maximum stratum level and the second maximum stratum level are transmitted through an eNB configuration transfer message and an MME configuration transfer message using an S1 interface.

3. The method of claim 1, wherein the first maximum stratum level and the second maximum stratum level are transmitted through a load information message using an X2 interface.

4. The method of claim 1, wherein the first maximum stratum level and the second maximum stratum level are transmitted through a resource status update message using an X2 interface.

5. The method of claim 1, further comprising receiving information indicating that the second maximum stratum level is to be transmitted to the eNB having the GPS from the eNB having the GPS.

6. The method of claim 5, wherein the information indicating that the second maximum stratum level is to be transmitted is received through an X2 request message or an X2 response message.

7. The method of claim 5, wherein the information indicating that the second maximum stratum level is to be transmitted is received through a load information message or a resource status request message.

8. The method of claim 1, further comprising receiving information indicating a frequency supporting a RIBS reference signal from the eNB having the GPS.

9. The method of claim 8, wherein the information indicating a frequency supporting a RIBS reference signal is received through one of an X2 request message, an X2 response message, or an eNB configuration update message.

* * * * *